United States Patent Office 3,748,177
Patented July 24, 1973

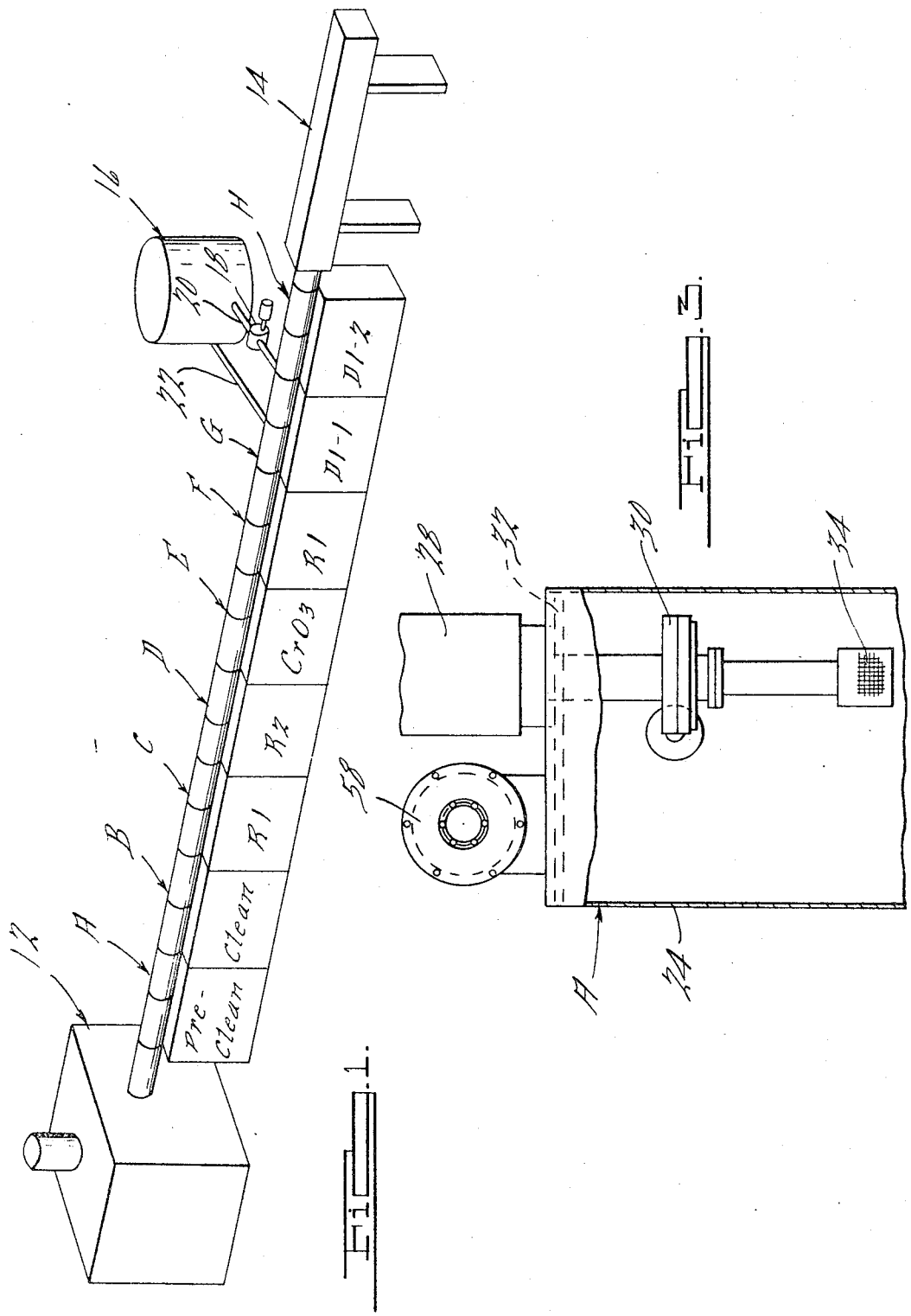

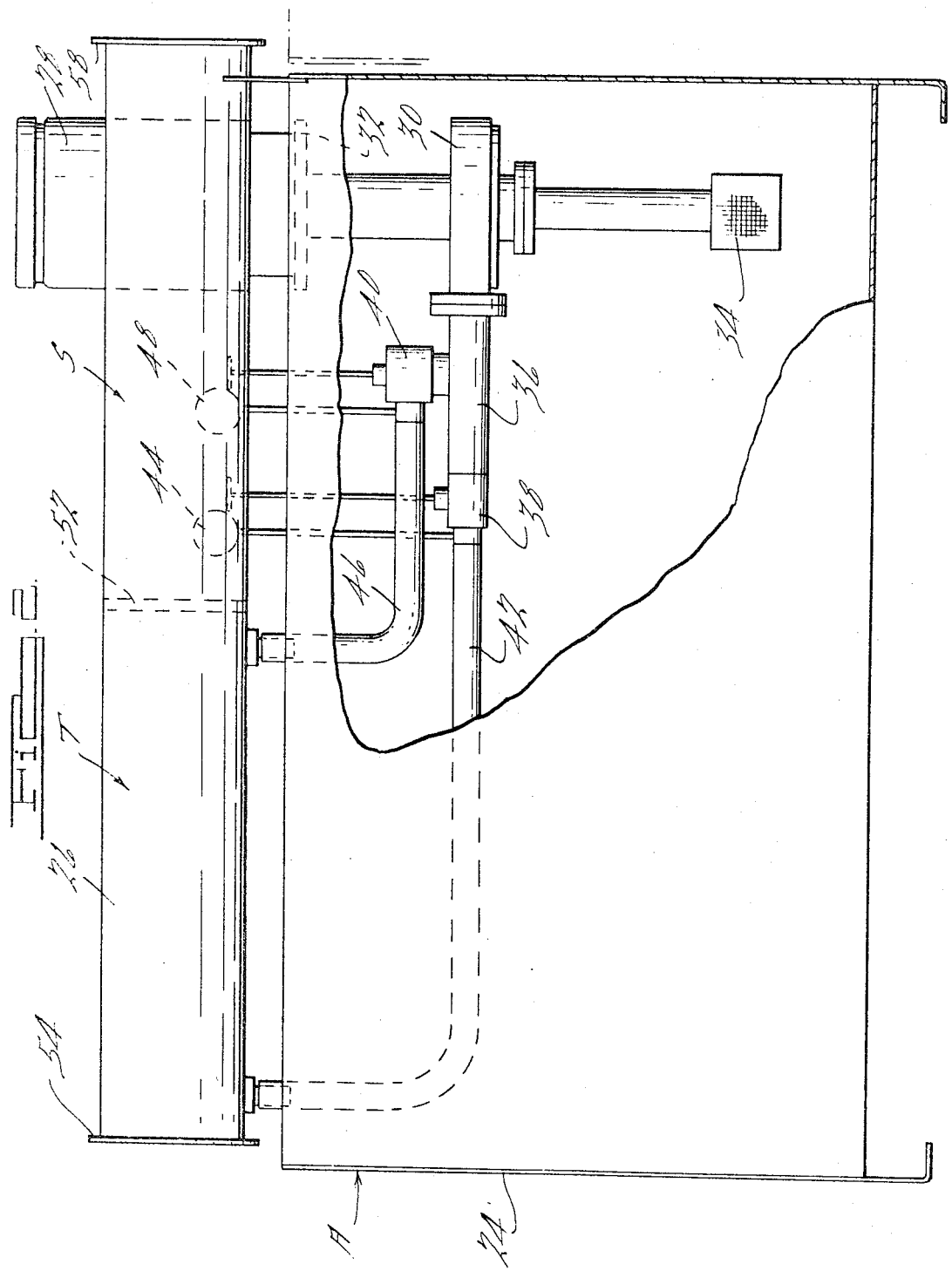

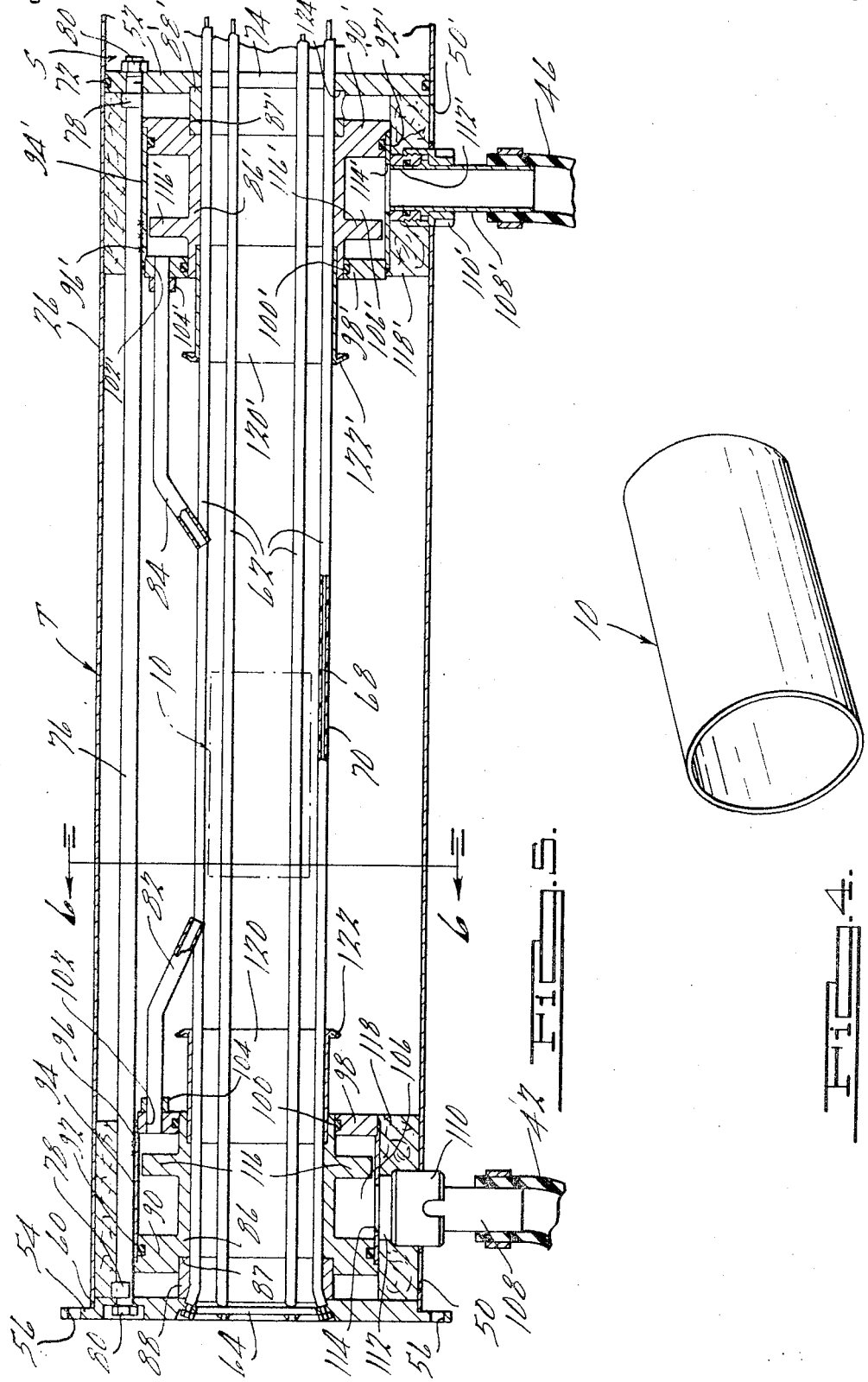

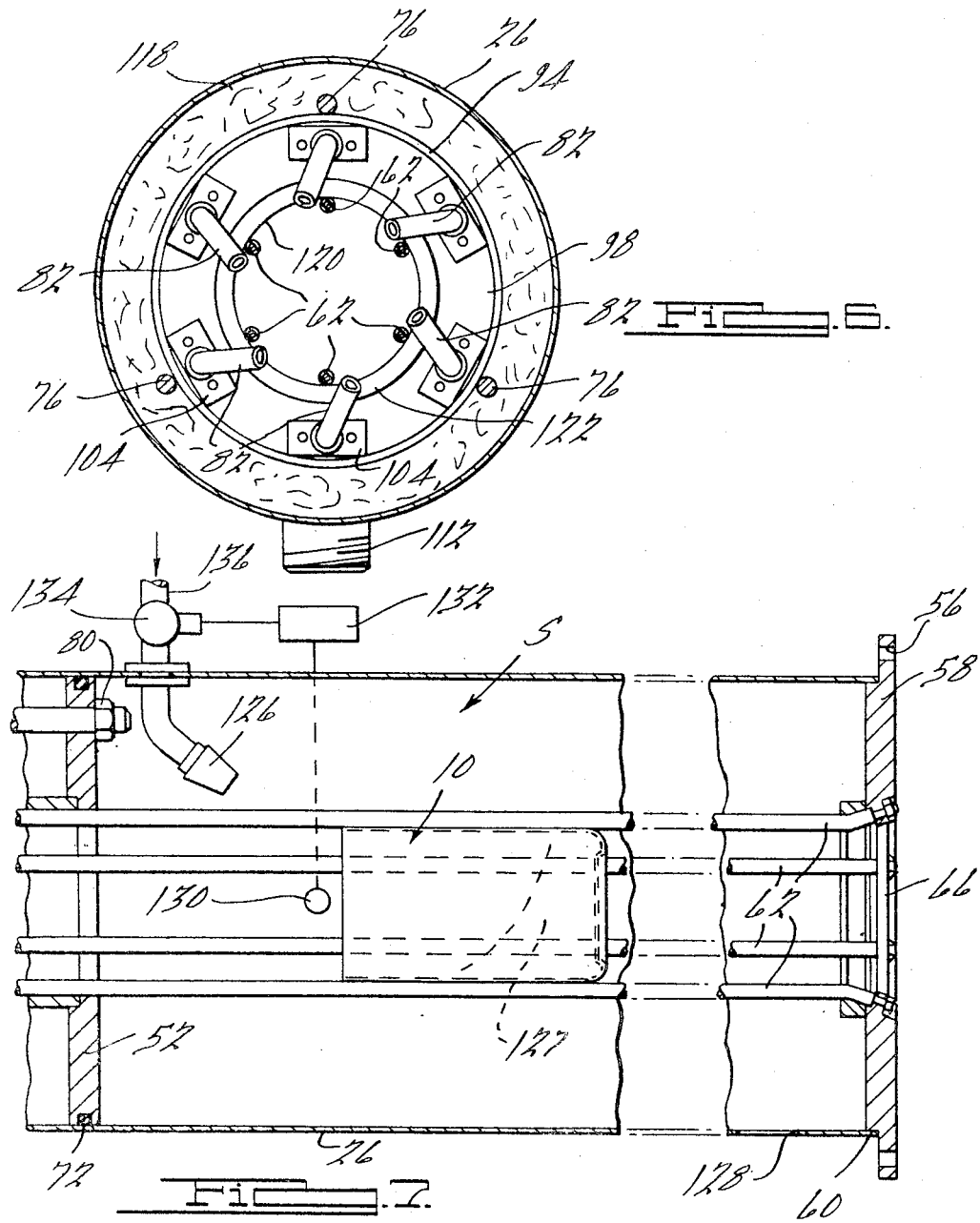

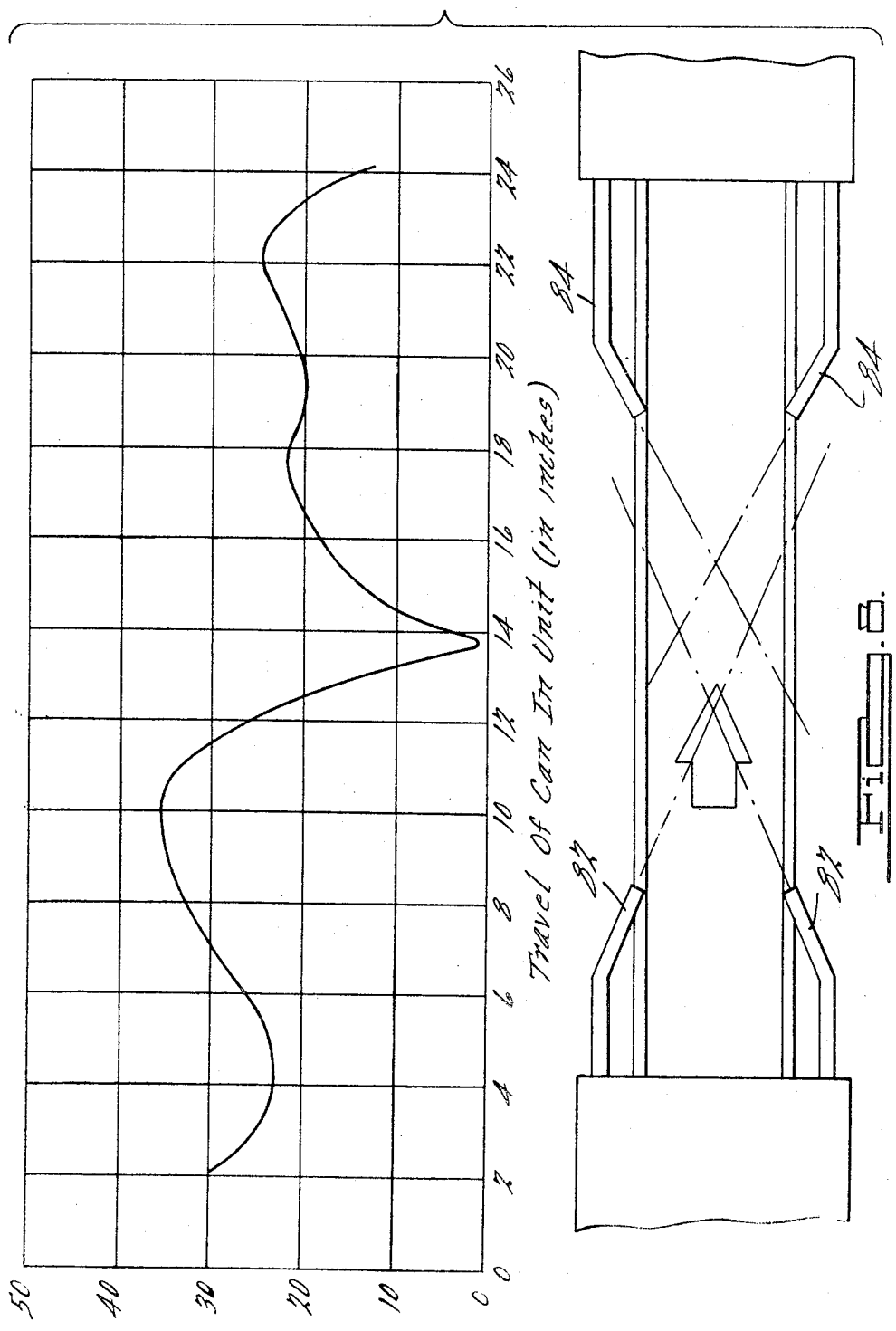

3,748,177
METHOD OF SIMULTANEOUS FLUID PROCESSING AND CONVEYING
John W. Neumann, Birmingham, Chester G. Clark, Grosse Pointe Woods, and Louis J. Minbiole, Jr., Detroit, Mich., assignors to Oxy Metal Finishing Corporation, Warren, Mich.
Original application Jan. 11, 1971, Ser. No. 105,368, now Patent No. 3,704,685. Divided and this application Mar. 29, 1972, Ser. No. 239,012
Int. Cl. B05c 3/08; B08b 3/08, 3/10; B67c 1/00
U.S. Cl. 134—30                                         9 Claims

ABSTRACT OF THE DISCLOSURE

An apparatus and method for processing elongated cup-shaped workpieces through one or a plurality of modular processing units, each of which incorporates a plurality of fluid streams oriented to impinge against the surfaces of the workpieces, thereby effecting a conveyance of the workpieces through the apparatus and a concurrent treatment of the interior and exterior surfaces thereof.

---

This is a division, of application Ser. No. 105,368, filed Jan. 11, 1971, now U.S. Pat. No. 3,704,685.

BACKGROUND OF THE INVENTION

The development of new materials and manufacturing techniques has occasioned rapid progress in the packaging art whereby containers of the requisite quality and low cost are now produced in quantities and at speeds heretofore believed unattainable. Such high-speed automatic machines are capable of forming containers in any desired preliminary or final configuration and in any one of a variety of materials, including glass, various plastic materials and, more frequently, metal and metal alloys such as, for example tin-plated steel, plastic-lined steel, aluminum and aluminum alloys and the like. Metallic containers of the foregoing type are in widespread use for packaging various foodstuffs, including beverages, for example, as well as various products which are dispensed in pressurized containers including, for example, paints, deodorants, insecticides, etc.

It is conventional practice, as part of the total fabrication process, to subject such containers to various post treatments after a preliminary or final forming operation has been performed in order to increase their resistance to corrosion and/or deterioration during storage, as well as to render them of the requisite cleanliness. Treatments of the foregoing type conventionally comprise one or combinations of various chemical treatments including, without limitation: a cleaning treatment to effect a removal of contaminating substances such as die lubricants from the interior and exterior surfaces of the containers; the application of one or combinations of various protective coatings and/or linings on the surfaces of the containers; chemical alterations of the surface characteristics of containers to render them more receptive to an overlying coating, such as paint, or to itself provide a desired decorative appearance; in addition to various intermediate treatments, such as rinsing, drying and the like. Because of the high rate at which containers can be fabricated on modern machinery and the increased complexity and variations of the post-treatments to which such containers are subjected, an increasing need has arisen for further improvements in the apparatuses and techniques employed for processing such containers through post-treatment cycles.

The method and apparatus comprising the present invention avoids the time-consuming and costly manual handling of individual containers while at the same time assuring that each container receives the desired degree of post-treatment during the high-speed processing thereof. In addition to the high production capacity of the apparatus and method comprising the present invention, further advantages and benefits are provided by the flexibility and versatility thereof, enabling quick and simple adaptation and/or modifications of the apparatus to different containers and/or different processing cycles with the continued assurance of appropriate post-treatment.

SUMMARY OF THE INVENTION

The foregoing and other benefits and advantages of the present invention are achieved by an apparatus and method which is particularly applicable, but not necessarily restricted, to the processing of cup-shaped workpieces or containers whereby the desired treatment is effected on the interior as well as exterior surfaces thereof. In its apparatus aspects, the invention comprises a framework including guide means formed with a longitudinally-spaced inlet end and outlet end for movably and guidably supporting workpieces during their travel therelong. Means are provided for introducing such workpieces into the inlet end of the guide means and such means may comprise the workpiece or container fabricating apparatus itself having its output end disposed adjacent to the inlet end of the processing apparatus. The process apparatus may be of a modular type construction whereby a plurality of individual units can be disposed in end-to-end relationship such that a workpiece is subjected to a plurality of sequentially-phased treatments during the course of its travel through the several processing units.

Each such modular processing unit incorporates a first nozzle or plurality of first nozzles for discharging one or a plurality of first streams of treating fluid in impinging relationship against a workpiece during its travel along the guide means and in a manner to effect movement of the workpieces toward the outlet end of the unit. In addition, each unit also includes a second nozzle or plurality of second nozzles for discharging one or a plurality of second streams of treating fluid in impinging relationship against the workpieces in the guide means at a location longitudinally spaced toward the outlet end from the point of impingement of the first streams and oriented to oppose the travel of the workpiece toward the outlet end of the unit. The first and second streams are controlled in operation so as to effect a continued conveyance of the workpieces through each processing unit with a deceleration of the workpiece at a position intermediate of its travel through each unit as a result of the opposing force applied by the second streams. The impingement of the streams on the workpieces in accordance with the present invention assures intimate contact of the treating fluids with the interior and exterior surfaces of the workpieces, reducing the required contact time to only a fraction of that heretofore considered necessary to achieve the desired treatment.

It will be understood that while the description of the preferred embodiments of the present invention as hereinafter set forth is made with particular reference to workpieces of a cup-shaped or hollow container-like configuration, the apparatus and method comprising the present invention are equally applicable for processing workpieces of alternative configurations including sealed hollow articles and solid three-dimensional articles whereby advantages and benefits are attained in the economy and simplicity of the processing thereof.

Still further benefits and advantages of the present invention will become apparent upon a reading of the description of the preferred embodiments, taken in conjunction with the accompanying drawings.

BRIEF DESCRIPTION OF THE DRAWINGS

FIG. 1 is a schematic perspective view of a plurality of modular processing units disposed in end-to-end relationship forming an in-line process arrangement through which the workpieces are successively advanced;

FIG. 2 is a side elevation view, partly in section, illustrating a typical modular processing unit constructed in accordance with the preferred embodiments of the present invention;

FIG. 3 is a fragmentary end elevation view, partly in section, of the process unit shown in FIG. 2;

FIG. 4 is a perspective view of a typical circular cylindrical container adapted for processing through the processing unit comprising the present invention;

FIG. 5 is a longitudinal vertical sectional view of the treatment section of the process unit shown in FIG. 2;

FIG. 6 is a transverse sectional view of the treatment section of the process unit shown in FIG. 5 as viewed substantially along the line 6—6 thereof;

FIG. 7 is a fragmentary vertical longitudinal sectional view of the separation section of the processing unit shown in FIG. 2; and FIG. 8 is a graph depicting the velocity of a workpiece in relationship to its position along the guide means of the processing section of the apparatus schematically illustrated in appropriate correlation therebelow.

DESCRIPTION OF THE PREFERRED EMBODIMENTS

Referring now in detail to the drawings, and as may be best seen in FIG. 1, a typical processing apparatus is schematically shown comprised of eight modular processing units designated as A through H, respectively. The arrangement shown in FIG. 1 is typical of one of a number of multiple post-treatments that can be performed in a continuous in-line processing system employing a plurality of removably connected individual processing units, each constructed in accordance with the embodiments of the present invention. The multiple-stage processing arrangement typified by that shown in FIG. 1 may comprise, for example, a process for applying a chemical conversion coating on aluminum containers of the type employed for packaging beverages of various types. Such a container 10 is illustrated in FIG. 4 and is typical of those produced by deep drawing a blank of aluminum through a single or multiple stage die-forming operation. The container 10 is comprised of an integrally formed continuous circular cylindrical side wall and concave or dished bottom wall which, upon subsequent cleaning, coating and filling, is adapted to be closed by affixing to the open end thereof a circular top wall having a tear-tab therein.

It will be apparent from the foregoing that aluminum containers, such as the container 10, derived from a forming operation, incorporate various contaminating substances including die lubricants on the surfaces thereof which must first be removed before a chemical conversion-type coating can be applied thereto. Such chemical conversion-type coatings, such as a chromate coating, provide for an improvement in the containers' resistance to chemical attack, as well as for providing an improved substrate for receiving supplemental decorative and/or protective coatings. The flexibility and versatility provided by the modular construction of the individual processing units enables the inlet end of the assembled apparatus to be connected directly to the output end of the container-forming apparatus, such as the apparatus 12 schematically shown in FIG. 1, and the output end thereof to a suitable subsequent processing device, such as a dryer 14, for drying and further conveyance of the containers to additional work stations at which subsequent work operations can be performed thereon.

Typical of the arrangements corresponding to that shown in FIG. 1 is a chemical conversion-type treating sequence in which a pre-cleaning treatment is effected in unit A, followed by a conventional cleaning treatment in unit B for removing any contaminating materials from the internal and external surfaces of the containers. The cleaning solutions employed in units A and B may comprise any suitable aqueous or organic cleaning solution such as, for example, an acid cleaner including a phosphoric or sulfuric acid base in combination with various surface active agents. Preferably, an alkaline cleaner is used in both units which usually comprises a mixture of alkali metal salts, such as sodium salts of carbonates, phosphates, polyphosphates and hydroxides, which are employed in amounts of about 0.5 to about 4 ounces per gallon and are adjusted so as to provide an aqueous cleaner solution pH of from about 9 up to about 11. In addition to effecting a removal of the contaminating substances from the container surfaces, any oxides present are also removed, accompanied by a mild surface etching of the container surfaces.

Following the pre-cleaning and cleaning steps, the containers are next subjected to successive water rinse treatments comprising a first rinse (R1) in process unit C and a second rinse (R2) in process unit D to effect a removal of all residual cleaning substances from the container surfaces and any remaining contaminating substances. Thereafter, the containers, upon emergence from process unit D, enter process unit E, in which they are contacted with a suitable chemical conversion coating treating fluid, and specifically, an aqueous chromate coating solution of any of the types well known in the art. Typically, chromate coating solutions comprise aqueous solutions containing hexavalent chromium ions in concentrations from about 0.2 to about 10 grams per liter at a pH usually ranging from about 1 to about 3, and at processing temperatures from about 60° to 130° F. The treatment cycle is such to effect the formation of an amorphous corrosion protective film of a desired thickness on the surface of an aluminum container, providing therewith the requisite corrosion protection and/or substrate over which subsequent organic finishes, such as decorative paints, can be applied.

Following the deposition of a chromate coating on the container surface, the container is again subjected to a first water rinse (R1) as in process unit F, followed by a first deionizing rinse (DI–1) in process unit G and a second deionized water rinse (DI–2) in process unit H. Upon passage outwardly of processing unit H, the resultant cleaned, treated and rinsed container can enter subsequent processing unit, such as the dryer 14, in which the residual rinse water is removed, whereafter further coating and/or work operations can be performed on the container in accordance with known practice. In the drying apparatus 14, the residual rinse water can be extracted or evaporated in accordance with known techniques, such as by hot circulating dry air.

It will be apparent from the processing arrangement illustrated in FIG. 1 that a continuous high-speed uninterrupted processing of workpieces, such as the containers 10, can be achieved without any intervening handling or manual manipulation thereof. Each processing unit not only performs a desired processing treatment on the workpieces, but also serves to effect a conveyance of such workpieces through each unit in appropriate individual longitudinally-spaced relationship and at comparatively high speeds such that production rates of from about 100 up to about 1000 containers or more per minute can be satisfactorily attained. The high speeds encountered at such production rates results in extremely short periods of contact of the containers with the fluids in each processing unit. Surprisingly, however, the hydrodynamic effects produced by the impingement of the treating fluids directly against the workpiece surfaces, in accordance with the structural and operational features subsequently to be described, provide adequate surface treatment in spite of treatment contact times of only a fraction of a second.

Since each of the individual modular processing units A through H, shown in FIG. 1, are substantially the same, a detailed description of one such unit, as shown in FIGS. 2, 3 and 5–8, will suffice for a complete understanding of the apparatus aspects of the present invention. It will also be appreciated that while the individual processing units may be of a modular construction in accordance with one practice of the present invention incorporating a self-contained supply of treating liquid, it is also contemplated, particularly for high-capacity production runs, that one or more processing units can be connected to an auxiliary treating fluid supply tank, such as the tank 16 connected to processing unit G of FIG. 1. The auxiliary tank 16 may be equipped with its own pump 18 in the supply line 20 and the treating liquid, after use, may suitably be recycled to the tank by a return line 22.

As shown in FIGS. 2 and 3, a modular-type process unit, such as the unit A, comprises a framework consisting of a three-dimensional tank 24 above the open upper end of which a circular cylindrical housing 26 extends and is supported in a substantially horizontally-oriented position. A self-contained pumping system comprising a vertically positioned motor 28 connected to a pump 30 is supported by a cross member 32 on the top of the tank 24. The solution contained within the tank is drawn in through an inlet screen 34 and is discharged into a flanged header conduit 36 provided with flow control valves 38, 40 for regulating the pressure of the treating liquid supplied to the housing. Flow control valve 38 is connected to supply line 42, which is provided with a gauge 44 for visually indicating the liquid pressure therein, while the discharge side of flow control valve 40 is connected to supply line 46 having a similar pressure gauge 48 connected thereto. The treating liquid supplied to the housing through the supply lines 42, 46 is again returned to the tank 24 through suitable drains 50 in the lower side of the housing 26 after being discharged from the treating and brake nozzles within the housing in accordance with the arrangement illustrated in FIGS. 5 and 6.

As will be noted in FIGS. 2 and 5, the housing is divided into two sections by means of a center support or partition 52, in which the first compartment or section T, as shown in FIG. 5, comprises the treatment section in which the treating fluid makes contact with the workpiece surfaces and a separation compartment or section S, as shown in FIG. 7, in which any residual treating fluid is removed from the surfaces of the workpiece.

Referring now in detail to FIGS. 2, 5, 6 and 7, the input side of a modular processing unit is provided with an entrance end plate 54, which is provided with a plurality of circumferentially-spaced bolt holes 56 around the periphery thereof for removably securing the inlet side of a processing section to a suitable workpiece supply apparatus or the output end of an adjacent processing unit. The opposite end of the housing 26 is similarly supported by a discharge end plate 58 provided with corresponding bolt holes 56 therearound. Each of the end plates 54, 58, as seen in FIGS. 5 and 7, is formed with a circular axially extending shoulder 60 on which the inner surface of the housing 26 is supported. Retention of the end plates in appropriate position is achieved by a plurality of longitudinally-extending guide rods 62 which are secured under tension to circular flanges 64, 66 defining an inlet end and outlet end in the end plates 54 and 58, respectively. In the specific form shown in the drawings, six guide rods 62 are employed which are spaced at angular increments of about 60° forming a passageway for movably and guidably supporting workpieces, such as the container 10 (FIG. 7), in longitudinally oriented relationship during their travel between the inlet end and outlet end of the processing apparatus.

In accordance with a preferred form, each guide rod comprises a stainless steel wire rod or core 68, as best seen in FIG. 5, having a plastic coating therearound, such as a high density polyethylene coating 70. The ends of the cores 68 are appropriately threaded and are adapted to receive a nut for removably securing and enabling adjustment of the tension of the guide rods to provide an appropriate guiding function. As will also be noted in FIGS. 5 and 7, the ends of the guide rods at a location adjacent to their points of attachment to the end plates are angularly offset to provide appropriate clearance and a smooth transition of a workpiece traveling from one unit to a next adjacent processing unit.

Referring now in detail to FIGS. 5 and 6, the treating section T comprises that portion extending from the entrance end plate 54 to the center partition 52. In this regard, the center partition 52 is formed with a peripheral groove in which a suitable sealing member, such as an O-ring 72, is disposed in sealing engagement against the inner surface of the housing 26, thereby preventing leakage of treating solution into the adjacent separation section S. The center partition 52 is also formed with an appropriate port 74 in the center thereof, through which the guide rods extend.

The longitudinal spacing of the center support 52 with respect to the entrance end plate 54 is maintained by three tie-rods 76, as shown in FIGS. 5 and 6, which are formed with stop blocks 78 adjacent to the ends thereof which are adapted to abut the opposing faces of the center partition and end plate. The projecting ends of the tie-rods are suitably threaded for receiving securing nut 80.

A first or treating nozzle assembly incorporating six treating nozzles 82 is located adjacent to the entrance end plate 54 and a similar second or brake nozzle assembly incorporating three brake nozzles 84 is disposed adjacent to the center partition 52. The six treating nozzles 82 are disposed with the outlet ends thereof oriented in approximately 60° equal angular increments and are offset, as best seen in FIG. 6, such that the fluid streams discharged therefrom do not impinge upon any of the guide rods 62, nor do they interfere or contact each other. The orientation of the treating nozzles 82 is such to effect an impingement of the fluid streams upon a workpiece, such as a container 10 shown in phantom in FIG. 5, while traveling along the guide rods in a manner so as to promote movement of the container or workpiece toward the outlet end of the treating section.

The brake nozzles 84 on the other hand, of which there are three in the specific embodiment shown, are positioned at 120° equal angular increments in a manner substantially identical to alternate ones of the nozzles 82 as shown in FIG. 6. The liquid streams discharged from the brake nozzles similarly are directed or aimed so as not to impinge upon the guide rods 62, nor to interfere or impinge upon themselves or the liquid streams being discharged from the nozzles 82. As will be apparent, the orientation of the brake nozzles 84 is such that the liquid streams, upon impinging on the container 10, induce or tend to cause movement of the container toward the inlet end of the section or in opposition to the direction imparted by the treating nozzles 82. This opposing or braking action of the brake nozzles 84 serves to effect a deceleration of a workpiece in a manner subsequently to be described in detail such that hydrodynamic effects are introduced assuring intimate contact of the treating fluids with the interior and exterior surfaces of the workpiece, as well as enabling satisfactory treatment to be achieved in only a fraction of the treating time conventionally considered necessary.

With the exception of the difference in the number and specific configuration of the nozzles 82 and 84, the treating nozzle assemblies and brake nozzle assemblies are in other respect substantially identical. Accordingly, a detailed description of the treating nozzle assembly will suffice and corresponding components of the brake nozzle assembly will be identified by the same numerals with a prime affixed thereto. As best seen in FIGS. 5 and 6, the treating nozzle assembly comprises a manifold body 86 which is of a tubular configuration and is adapted to encircle the guide rods 62 extending longitudinally therethrough. The manifold body 86 is formed with an annular recess 87 along the portion adjacent to the end plate 54 within which the edge portion of an inlet sleeve 88 is received for maintaining the manifold body in appropriate spaced relationship relative to the end plate. A portion of the internal face surface of the inlet sleeve 88 is chamfered in order to accommodate the angular offset of the end portions of the guide rods.

The manifold body is formed with an integral end wall 90 which is provided with an annular groove in which a sealing member, such as an O-ring 92, is disposed which in turn is seated in sealing engagement against an encircling collar 94. The collar 94 is welded, such as at 96, to the tie-rods 76. The forward edge portion of the collar 94 is securely fastened to a nozzle ring 98 which is formed with an annular groove around its inner edge for receiving an O-ring 100 which sealingly engages the forward projecting tubular end portion of the manifold body 86.

In the treating nozzle assembly, the nozzle ring 98 is formed with six circumferentially spaced ports 102 into which the rear end portion of the nozzles 82 extend. Each nozzle 82 is also provided with an apertured flange 104 for securing the nozzle against the face of the nozzle ring 98. In this regard, it will be noted that the nozzle ring 98' of the brake nozzle assembly is identical to that of the nozzle ring 98 with the exception that only three ports 102' are provided at 120° are angular increments for removably receiving the three brake nozzles 84.

The manifold body 86 in combination with the collar 94 and nozzle ring 98 define an annular manifold chamber 106 which is disposed in communication with a pressurized supply of treating fluid such as by means of the supply pipe or tube 42. In a similar manner, the manifold chamber 106' of the brake nozzle assembly is connected to the supply tube 46 in accordance with the arrangement previously described in connection with FIG. 2. As shown in FIGS. 5 and 6, the supply tube 42 is secured to a hose connector 108 which in turn is retained by a coupling nut 110 in communication with a threaded connector 112 disposed in communication with a port 114 formed in the lower portion of the collar 94.

In order to provide for well defined streams of treating fluid as discharged from the nozzles 82, 84 as opposed to divergent streams of increased area on moving in a direction away from the nozzle outlet, it is preferred to incorporate suitable means in the manifold assemblies to minimize or completely eliminate velocity vectors in directions other than a longitudinal direction corresponding to the discharge axis of each nozzle. In the specific embodiment illustrated in FIG. 5, axial flow of treating fluid into the inlet end of each nozzle from the manifold chamber 106 is achieved by the interposition of a plurality of circumferentially spaced radially extending vanes 116 which are operable to provide for an axial guided flow of treating fluid toward the inlet ends of the nozzles. Alternative satisfactory arrangements can be employed in lieu of the guide vanes 116 for removing turbulence from the treating fluid assuring a laminar unidirectional axial flow through the nozzle, providing therewith a well defined stream having a substantially non-divergent configuration. Such substantially non-divergent and dense streams of treating fluid are effective upon impingement against a workpiece to produce a scrubbing action and to assure an intimate contact of the treating fluid with the surfaces preventing the formation of any stagnant films which inhibit surface treatment, thereby assuring rapid, uniform and substantially complete treatment in unexpectedy short contact periods. Such dense, substantially non-divergent streams also enable more accurate focusing and concentration of the streams without encountering mutual interference therebetween.

As will be noted in FIGS. 5 and 6, the axes of the treating nozzles 82 are oriented such that when no workpiece is present in the guide means the fluid streams discharged therefrom impinge against the inner surface of the housing 26 at a location adjacent to the brake nozzle assembly. Similarly, the points of impact of the treating fluid streams discharged from the brake nozzles 84 are at locations adjacent to the treating nozzle assembly when not interrupted by the presence of a workpiece traveling along the guide rods. Under such conditions when the treating streams are not intercepted by a workpiece, it is desirable to minimize splashing and spray by filling the annular area around the treating and brake nozzle assemblies with a porous impact absorbing material indicated at 118 such as a stainless steel wire wool packing material. The stainless steel packing material 118 is effective to absorb the momentum of the fluid streams and thereafter enable the fluid to drain downwardly around the exterior of the manifold housings out through the drain ports 50.

The interception and prevention of a re-entry of any spray of treating fluid within the guide path defined by the interior of the guide rods is prevented or substantially minimized by means of a spray or deflector shield 120 formed with an outwardly flanged end 122 affixed to and projecting axially of the outlet end of the treating nozzle assembly. The spray shield 120' defining the inlet through the brake nozzle assembly also serves to minimize a carry-out of treating fluid into the separation section of the processing unit. Any treating fluid accumulating within the interior of the brake nozzle assembly as defined by the interior of the spray shield 120' and manifold body 86' is readily drained therefrom through a suitable drain aperture formed in the lower section of the deflector ring 88'.

Referring now to FIG. 7, the workpiece or container 10 upon passage through the center partition 52 into the separation section S remains in guided longitudinally oriented relationship within the guide rods 62 and generally contains a quantity of residual treating fluid within the interior thereof as schematically illustrated in phantom at 127. In order to effect a removal of the residual treating fluid 127 to minimize carry-over into the next processing unit, a combined purging and acceleration of the container 10 is accomplished by means of a large volume, high velocity air blast discharged from a nozzle 126 located at a position adjacent to the center partition 52. The axis of discharge of the nozzle 126 is such as to direct a large volume of high velocity air into the interior of the container 10, effecting a physical displacement of the residuary treating fluid 127 in addition to effecting an acceleration of the container 10 toward the outlet in the discharge end plate 58. The acceleration of the container further serves to substantially completely separate any residual treating fluid from the container due to inertial effects and wherein the residual treating fluid removed drops downwardly and is collected within the housing 26 and is discharged out through a suitable drainage port 128 therethrough. In one specific embodiment in which liquid was separated from an aluminum can of the type used for beverages, the axis of the nozzle 126 was oriented at an angle of 11° from the axis of travel and air at a pressure of 80 p.s.i. was discharged therefrom whereby less than about two grams of residual water remained on the container.

In accordance with one embodiment of the present invention, the high velocity air discharged from the nozzle 126 is accomplished on a continuing basis and is intercepted by the containers as they successively travel from the treating section T into the separation section S. Alternatively, the nozzle 126 can be operated on a pulsing basis employing a suitable sensing device such as a proximity switch 130 located adjacent to the guide rods for sensing the presence of a container. The proximity switch is connected in accordance with known techniques to appropriate circuitry 132 for actuating a remotely-actuatable valve 134 in the supply line 136 connected to the air nozzle, effecting a discharge of air therefrom in timed relationship relative to the position of the container 10 such that the large volume, high velocity air blast is directed into the open rearward end of the container to effect a displacement of the liquid and an acceleration of the container in a manner previously described.

The structural components of the processing apparatus as shown in the drawings may be comprised of any suitable material which is of adequate strength and is resistant to and compatible with the treating fluids with which they may come in contact. Stainless-type steels have been found particularly suitable for this purpose in addition to various synthetic plastic materials by themselves or in the form of protective coatings or substrates.

The high-speed and unexpectedly rapid and efficient treatment of workpieces pursuant to the hydrodynamic effect of the streams of treating fluid can perhaps be best described with reference to the graph and schematic diagram comprising FIG. 8 of the drawings. In the specific arrangement as previously described, six treating nozzles 82 and three brake nozzles 84 are provided which in combination direct nine streams in impinging relationship against the interior and exterior surfaces of a container in a manner to effect a conveyance of the container from the inlet end of the processing section out through the outlet end thereof accompanied by a deceleration of the workpiece during the course of its travel in response to the opposing or braking forces applied thereto by the braking streams. The net forces applied to the container by the treating streams through appropriate adjustments in volume, velocity and directional orientation is such as to provide an overriding force toward the outlet end of the process apparatus thereby overcoming the retarding effect of the braking streams. In some instances, such as that typified in the graph of FIG. 8, the deceleration of the container in response to the braking nozzles results in an almost complete stoppage of the container for a small fraction of a second until a dynamic unbalance of forces is again attained causing the container to progress toward the discharge end of the unit.

The data and schematic arrangement as portrayed in FIG. 8 is based on a treating section similar to that shown in FIG. 5 using water at a substantially constant manifold pressure of 30 p.s.i. for forming six treating streams and three braking streams of constant flow for impinging against an aluminum container of the type used for packaging beverages positioned in longitudinal orientation within the guide means having its open end disposed in a trailing position. As indicated in the graph, the container entering from the prior unit at a position two inches within the guide means is traveling at a velocity of about 30 feet per second and progressively decreases in speed to a level of about 23 feet per second in response to frictional forces acting thereon. When the forward or leading edge of the container travels to a position of from four to five inches along the guide means, the forward peripheral edge thereof is contacted by the six pressurized streams applying a force thereto in a direction toward the right, as viewed in FIG. 8, effecting a progressive acceleration thereof to about 36 feet per second at a point corresponding to a travel of about 10 inches. At that point, the three braking streams discharged from the brake nozzles 84 impinge against the leading edge of the container applying an opposing force thereto. In that position, the streams discharged from the treating nozzles 82 impinge against the exterior cylindrical surface of the container. During further travel of the container from the 10 inch travel point to a position of about 13¾ inches along the guide means, a progressive deceleration of the container occurs in view of the retarding effect imposed by the brake streams impinging directly against the closed bottom wall of the container. The container, at this point, comes to a virtual standstill while subjected to impingement by nine pressurized streams of treating fluid.

The six streams of treating fluid discharged from the treating nozzles under this dynamically balanced condition are now oriented so as to enter the open rearward end of the container effecting a thorough treatment of the interior surfaces thereof, including the inner surface of the end wall while simultaneously effecting a progressive fill-up of the container with treating fluid. This progressive build-up and orientation of the nozzles into the interior of the container imposes a force thereon which overcomes the retarding force of the braking streams whereupon an acceleration of the container again occurs which attains a maximum speed of about 23 feet per second at the 18 inch travel point. During this further travel, the braking effect of the braking treating streams is reduced since their point of impingement is now against the cylindrical peripheral surface and not the forward end wall of the container. The momentum of the container and of the treating liquid therein carries it beyond the brake nozzles and out of contact with the streams discharged from the treating nozzles. Continued movement of the container thereafter is in accordance with the previously described practice whereby the container enters the separation section and is separated from the residual treating liquid by means of impingement of high velocity air charge.

It will be appreciated by those skilled in the art that appropriate variations in the travel versus velocity pattern of containers or other workpieces adaptable to the system can be achieved by appropriate control of the number and/or orientation and/or velocity and/or volumes of treating fluid streams discharged from the treating and braking nozzles in order to attain the desired surface treatment. It is accordingly contemplated that in lieu of the arrangement and operation previously described, a deceleration of the workpiece followed by an acceleration thereof during its travel through the treating streams can be achieved by rapid but controlled variations in the pressure of the liquid in the treating nozzle assembly and brake nozzle assembly in a manner to assure appropriate spacing of workpieces during their processing. For example, a treating and brake manifold assembly can be provided each having the same number of nozzles from which a treating fluid is discharged whereby a workpiece is retained in a substantially stationary dynamically balanced condition in response to impingement of the several streams at a position intermediate its travel through the treating section. An unbalancing of this condition whereby an acceleration of the workpiece and its movement toward the outlet end is achieved by a pulsed increase in pressure of the treating liquid in the treating nozzle manifold or a pulsed decrease in pressure in the brake nozzle assembly. Alternatively, an intermittently operable treating nozzle can be provided which is operative to discharge a pulsed stream of treating liquid or pressurized gas against a workpiece in a rapid split-second timed sequence creating a situation of unbalance and causing acceleration of a workpiece and a movement thereof through the opposing forces being exerted by the brake nozzles. In an equivalent manner, one or more of the brake nozzles can be operated on an intermittent timed sequence to achieve a similar effect.

While it will be apparent that the preferred embodiments of the invention disclosed are well calculated to fulfill the objects above stated, it will be appreciated that the invention is susceptible to modification, variation and change without departing from the spirit thereof.

We claim:

1. A method for processing workpieces comprising the steps of guidably supporting a workpiece for travel along a path in a first direction, discharging a first stream of treating fluid in impinging relationship against a workpiece during its travel along said path and in a manner to induce movement thereof in said first direction, discharging a second stream of treating fluid in impinging relationship against a workpiece during its travel along said path at a location longitudinally spaced in said first direction from the point of impingement of said first stream and in a manner to oppose the travel of the workpiece in said first direction, and controlling said first and said second stream to effect a conveyance of the workpiece along said path and a deceleration in its speed at a location intermediate its travel past said streams in response to the opposition of said second stream assuring thereby intimate contact of said treating fluid with the surfaces of the workpiece.

2. The method as described in claim 1, in which a plurality of first streams and a plurality of second streams are provided and including the further step of aiming said first and said second streams so as not to impinge upon each other.

3. The method as defined in claim 1, including the further step of intercepting the first and the second said stream after passing beyond said path and after deflecting off said workpiece and thereafter returning the intercepted said treating fluid to a storage reservoir.

4. The method as defined in claim 1, including the further steps of continuing to guide the workpiece along said path to a position located beyond the point of impingement of said streams and thereafter directing a high velocity blast of gas against the workpiece in a manner to effect an acceleration thereof in said first direction and a removal of substantially all of the residual treating fluid thereon.

5. The methods as defined in claim 1 in which the workpieces comprise elongated cup-shaped articles having an open end and including the further steps of guidably supporting the articles in a longitudinally oriented relationship with the open end thereof in a trailing position and wherein the first stream of said treating fluid is discharged in a direction so as to enter the open end of said article during a portion of its travel along said path and in impinging relationship against the interior surfaces thereof.

6. A method of processing workpieces including contacting a workpiece with a liquid treating solution for a period of time sufficient to provide the desired treatment thereof, thereafter guidably supporting the workpiece for travel along a preselected path, and discharging a high velocity blast of gas against the workpiece during its travel along said path in a manner to effect an acceleration thereof and an increase in its velocity of travel along said path and a removal of substantially all of the residual treating liquid thereon.

7. The method as defined in claim 6, further characterized in that the workpiece is of an elongated cup-shaped configuration and including the further steps of orienting the workpiece such that the open end thereof is in a trailing position during the travel of the workpiece along said path and discharging said blast of gas in a direction so as to enter the interior of the workpiece effecting a displacement and removal of any residual treating liquid entrapped therein.

8. The method as defined in claim 7, wherein said blast of gas is continuously discharged in a direction to intercept a workpiece traveling along said path.

9. The method as defined in claim 7, including the further steps of sensing the position of a workpiece traveling along said path and discharging said blast of gas in response to said sensing means when a workpiece is in an appropriate position along said path for receiving said blast through the open end thereof.

References Cited
UNITED STATES PATENTS

| | | | |
|---|---|---|---|
| 914,475 | 3/1909 | Beduwe. | |
| 1,252,302 | 1/1918 | Riesenecker | 134—32 X |
| 1,294,455 | 2/1919 | Hardy | 134—25 R X |
| 1,528,995 | 3/1925 | Singer | 34—10 |
| 2,078,235 | 4/1937 | Chapman | 302—14 |
| 2,085,842 | 7/1937 | Wentworth | 34—10 |
| 2,760,873 | 8/1956 | Munz | 99—214 |
| 3,105,720 | 10/1963 | Barker | 302—2 R |
| 3,118,459 | 1/1964 | Stumpf | 134—25 R X |
| 3,241,520 | 3/1966 | Wurster et al. | 118—62 |
| 3,620,813 | 11/1971 | Minbiole et al. | 117—94 |

MORRIS O. WOLK, Primary Examiner

D. G. MILLMAN, Assistant Examiner

U.S. Cl. X.R.

34—10; 117—94; 134—26, 32, 34, 37; 148—6.2; 302—14, 20